Figure 5:
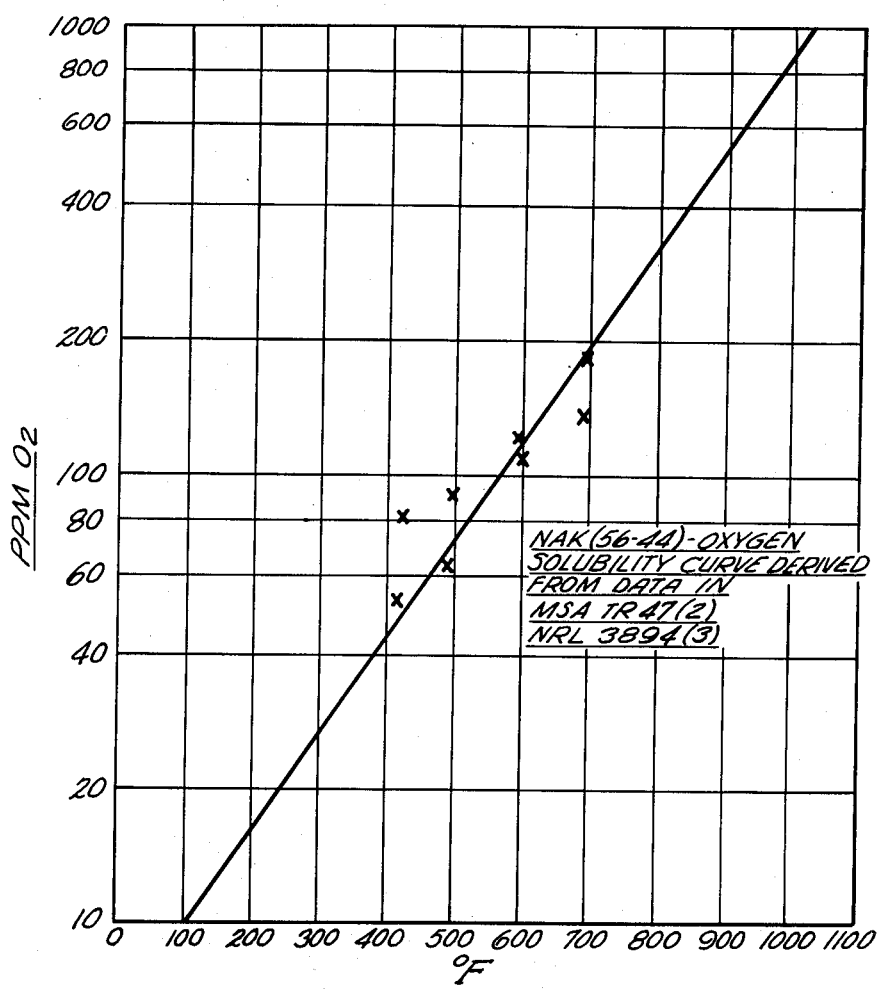

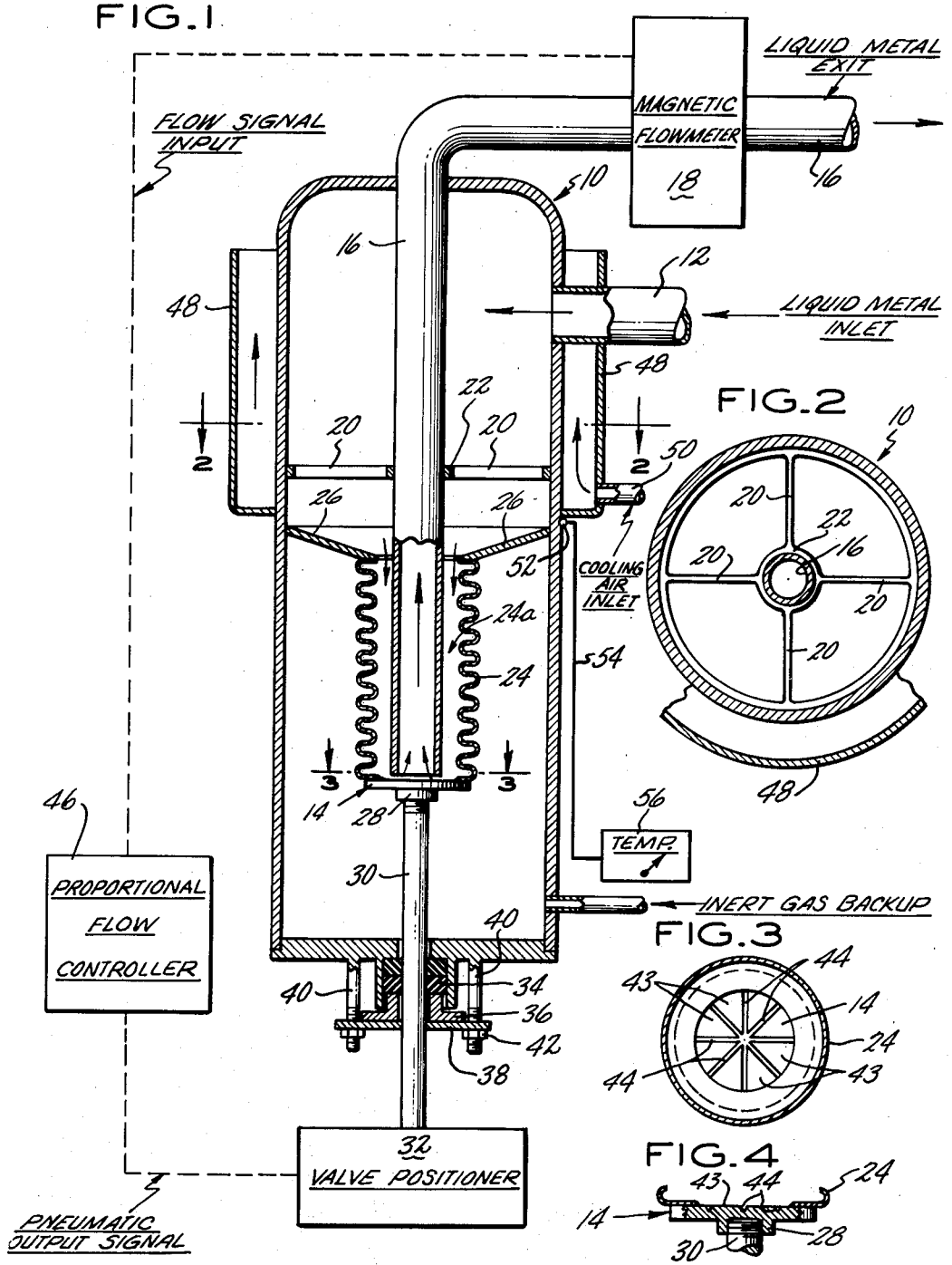

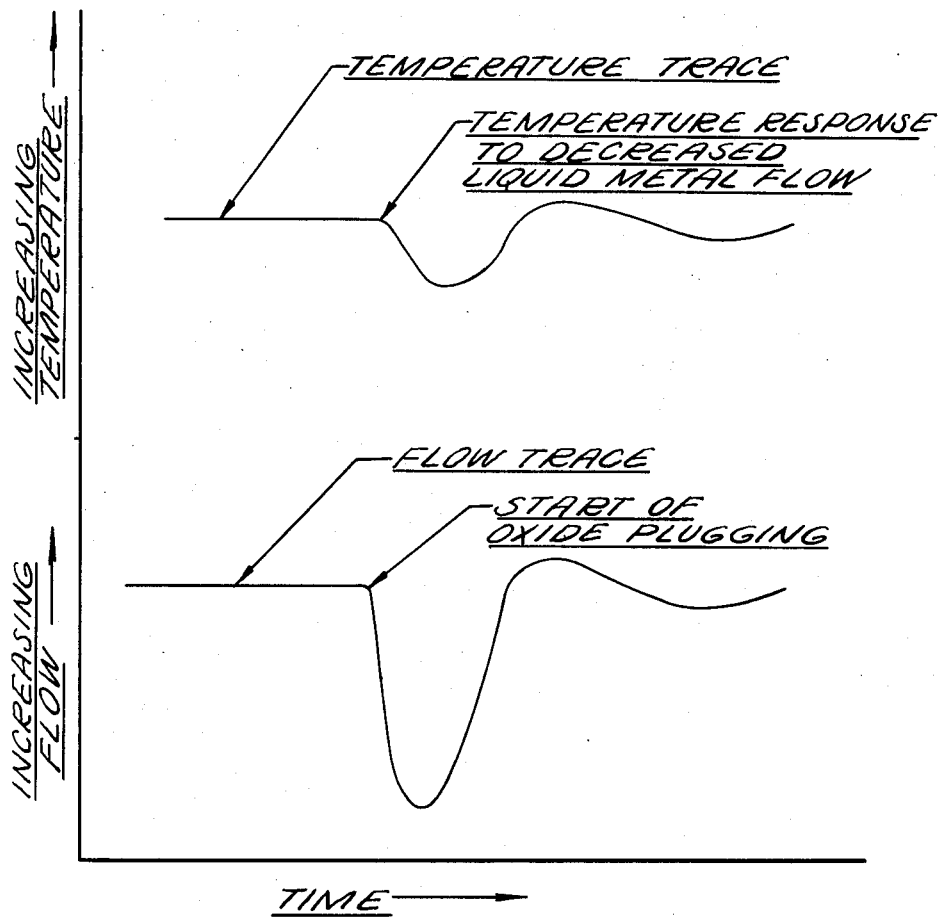

3,200,637
CONTINUOUS OXIDE PLUGGING INDICATOR
Donald K. Baliou, Rockfall, and Jesse C. Hendelman, Durham, Conn., assignors to United Aircraft Corporation, East Hartford, Conn., a corporation of Delaware
Filed Oct. 25, 1962, Ser. No. 233,018
13 Claims. (Cl. 73—61)

This invention relates to high-temperature liquid-metal heat-transfer systems and has particular reference to improved means for the determination of impurities in the liquid metal, such as oxide of the metal, which may form during the operation of the system.

Liquid metals have characteristics which make them very desirable for use in systems where it is desired to transfer heat from a heat source, for example a nuclear reactor, to a heat exchanger in which the liquid metal gives up much of its heat and is then returned to the reactor in a cooled but still liquid state. For example, liquid metals such as sodium and sodium-potassium alloy have very high thermal conductivities as compared with that of water; their specific heats are lower so that they heat to operating temperatures more readily; they have high coefficients of heat transfer; and they are stable over a wide range of temperature.

However, liquid metals oxidize very readily in the presence of any air that may get into the circulating system, resulting in the formation of non-metallic oxide of the metal being used. Also such impurities may be formed by reduction of metallic oxides in the walls of the conduit and heat exchanger surfaces.

The formation of these oxides has unfortunate results. The metal will precipitate in the system wherever saturation occurs at lower temperatures in the system. This all results in reduced efficiency of the system and, if it continues, in complete failure of the system. Consequently it is imperative that some means be provided for indicating the degree of oxide formation in the liquid metal so that corrective measures may be taken before serious trouble occurs.

Prior to this invention it was the practice to install an oxide plugging indicator in the circulating system consisting of a plate with a plurality of small holes in it through which the liquid metal was passed. Whenever precipitated oxide lodged in the holes and partially plugged the plate, it was an indication that saturation had occurred at the temperature of the liquid metal at that point. The limitation to this method of detecting the presence of oxide and other impurities will be apparent. If the holes were completely plugged, circulation stopped and circulation could not be resumed through the plate.

It is an object of this invention to provide an improved oxide plugging indicator.

A further object of this invention is to provide such an indicator of oxide level which is continuous in operation.

A further object of this invention is to provide such an indicator including an oxide plugging plate and means which, once the indicator has been adjusted to the then existing oxide level in the liquid metal, will continuously monitor the system to indicate any increase in oxide level.

These and other objects and advantages of the invention will be pointed out or will become apparent from the following detailed description of one embodiment of the invention, as illustrated in the accompanying drawings.

In these drawings, FIG. 1 is a somewhat diagrammatic showing of the improved oxide plugging indicator of this invention;

FIG. 2 is a section on line 2—2 of FIG. 1 with parts broken away; FIG. 3 is an enlarged section on line 3—3 of FIG. 1; FIG. 4 is a similarly enlarged enlarged view showing the plugging disc in elevation with parts of its periphery broken away; FIG. 5 is a chart showing the correlation of plugging and oxide analysis data with the oxygen solubility curve for NaK; and FIG. 6 shows the reaction of the temperature and flow indicating means of the system in response to oxide plugging at the plate.

As shown in the drawing, liquid metal enters a cylindrical casing 10 through an inlet conduit 12, flows over a plugging plate 14, and leaves the housing through a conduit 16 extended axially into casing 10.

A magnetic flowmeter 18 of the permanent magnet type is provided in the outer conduit 16 which produces a signal proportional to liquid-metal flow in conduit 16.

Casing 10 has an internal spider 20 welded thereto including an axial ring 22 through which conduit 16 extends and which centers and supports the conduit. Plugging disc 14 is supported at the lower end of a bellows 24 concentric with conduit 16. As shown most clearly in FIG. 4, the lower end of bellows 24 is welded to the circular margin of the upper face of the disc, forming a fluid-tight closure for the lower end of the bellows. A conical washer 26 has its outer periphery welded to the inner wall of casing 10 and has its inner periphery welded to the upper end of bellows 24, thus forming a liquid-metal inlet chamber about the outlet conduit 16. Plugging disc 14 has a bottom, axial threaded socket 28 into which is threaded the stem 30 of a valve positioner 32 located outside of casing 10. Where stem 30 passes through the bottom wall of casing 10, suitable packing means 34 are provided in the nature of a gland packing, the gland member 36 which bears against the packing 34 being held in place by plate 38 mounted on bolts 40 carried by the casing and adjustably secured by nuts 42.

The plate 14, which is shown in detail in FIGS. 3 and 4, has a flat upper surface 43 which is provided with a number of fine radial grooves 44. Normally the flat surface 43 of the plate is held against the open end of conduit 16 with the center of the plate aligned with the axis of the conduit as shown in FIG. 1. As a result, the fluid in flowing from chamber 24a within the bellows into the conduit 16 traverses the grooves 44.

A proportional flow controller 46 provides a pneumatic output signal for operating the valve positioner 32. The flow controller is governed by the output signal of the magnetic flowmeter 18.

Means is provided for cooling the liquid metal as it flows through the part of casing 10 which is above the bellows and plugging disc section. To this end a cylindrical jacket 48 is provided which surrounds the upper portion of casing 10 into which a cooling air stream is admitted through conduit 50. The heated cooling air is discharged at the top of the jacket to atmosphere.

An inert gas backup is provided in the lower portion of the casing 10 surrounding the bellows to equalize bellows forces and also to provide a safety backup should the bellows develop a leak.

Means is also provided for giving a continuous indication of the temperature of the liquid metal in the vicinity of plugging plate 14. As herein shown, a thermocouple 52 is mounted on the outside diameter of casing 10 above the bellows and below the regenerative heat exchanger section above the washer 26 and is connected by leads 54 to a temperature indicator 56 which, since it is located below air inlet 50, gives a constant indication of the temperature of the liquid metal inside the bellows and at plate 14.

In the operation of the improved oxide plugging indicator, high-temperature liquid metal enters the upper portion of casing 10 through conduit 12, flows into chamber 24a, and then passes through grooves 44 in the plugging plate 14 and into the axial outlet conduit 16. As it flows out of casing 10 through conduit 16, it flows through the magnetic flowmeter 18 back to the system. A manually adjustable cooling air flow is provided through conduit 50 to the space inside the jacket 48 for the purpose of cooling the liquid metal to a lower temperature level as it flows through the upper section of casing 10. The proportional flow controller 46 is set to maintain a flow which is specifically chosen after taking into consideration the liquid metal pumping head, the available cooling air, the pressure drop, and other system considerations. As the liquid metal cools inside the casing 10, if there is oxide present, the oxide will begin to precipitate at the saturation temperature. These oxide particles will first collect in the grooves 44 and, as they build up and reduce the cross section of the grooves, the flow of liquid metal through conduits 12 and 16 will be reduced.

This reduction in flow will be detected instantly by a decrease in temperature, and the magnetic flowmeter will change its flow signal to the proportional flow controller, which in turn will operate the valve positioner to lower the plate away from the end of conduit 16. The plate will be lowered sufficiently to initiate the restoration to the average flow rate which was originally selected for the flow controller. However, no flow controller now available on the market is capable of instantly restoring the original flow rate without initial hunting. Instead it will overcorrect, resulting in hunting which will initially produce an increased flow of liquid metal over the preset value. It is this increased flow which gives the increased temperature which clears the plate. With the increased flow of liquid metal, due to lowering of the plate and also due to clearing of the oxide from the grooves 44 by reason of the liquid metal flow, the temperature of the liquid metal passing over the plate will rise. This rise in temperature will help to clear the grooves by dissolving the oxides which have settled in the grooves. If the increase in oxide content has not been too great, the proportional flow controller will finally maintain liquid metal exit temperatures at the plate at oxide plugging temperature or slightly above this temperature. If the increase is too great, the cooling air will have to be manually adjusted at inlet 50. As long as the oxide level of the liquid metal entering conduit 12 remains constant, the proportional flow controller will produce a fairly constant liquid metal flow and a fairly constant temperature at plate 14. It will be understood that in operating the system in a continuous manner to monitor the oxide content, what is desired is to have an instant indication of any increase in oxide level. In the operation of a liquid metal system, while the minimum oxide contamination is desired, there is usually a predetermined maximum oxide content which is considered to be tolerable. This predetermined maximum oxide content is low enough to prevent serious liquid metal corrosion and oxide plugging in any part of the primary heat transfer system. Oxide is removed from the liquid metal by appropriate means until the plugging temperature indicates that the oxide contamination is below the maximum oxide content which is tolerable. For continuous operation, the plugging indicator, by adjustment of the cooling air, is set to maintain a temperature at or slightly above the known plugging temperature. When the oxide content rises above the known plugging temperature, plugging will occur, resulting in immediate unbalance of the system and exaggerated hunting of the controls.

Of course, this device may be utilized at any time to determine the exact plugging temperature by manipulating the manual valve controlling the air flow at inlet 50. Plate temperature, as shown by indicator 56, and a saturation curve for the particular liquid metal being used, give an accurate indication of oxide level in the liquid metal in the system. FIG. 5 shows the solubility curve for NaK. As oxides are removed by an oxide control system or added by contamination, the saturation temperature will change and periodic adjustment of cooling air flow will be required. The new level of oxide contamination will still be available by looking at the temperature indication shown on indicator 56 and the saturation curve. This will be evident when it is considered that as the plate grooves plug more the system reacts to maintain the flow, but due to its inherent characteristics the flow controller overcorrects, resulting initially in increased flow past the grooves and hence hotter liquid metal at the plate. The increased temperature and increased flow dissolve the oxide and clear the grooves. As a result, the measure of temperature gives a true measure of contamination.

From the above description it will be evident that an improved oxide plugging indicator has been provided which is capable of giving continuous indications of increases in oxide level in the liquid metal. At each oxide level there is a saturation temperature of the liquid metal at which the oxide begins to precipitate. After this temperature is known, the point at which precipitation begins will establish the amount of oxide present in the liquid metal. It will also be evident that by the operation of this improved plugging indicator when plugging begins an increased flow of liquid metal is produced due to overcorrection by the flow controller which increases the temperature of the liquid metal at the plate. This increased flow of hotter liquid metal works two ways to clean the oxide from the grooves. Thus a substantial increase in contamination will immediately become apparent. The improved movable plugging plate avoids the possibility of solid plugging of the plate and allows the oxide precipitated to be washed out and free flow to be re-established.

The plugging plate of this invention thus has two major advantages. First, solid plugging of the plate is prevented by reason of the variable flow orifices and, second, it provides continuous monitoring. Further, the passages 44 in the plugging plate can be made very small in cross section as a result of the continuous flow principle of this invention with resulting high sensitivity to precipitating oxides.

While only one embodiment of the invention has been described herein, it will be obvious that many changes in the construction and arrangement of the parts may be resorted to without departing from the scope of the invention as claimed herein. For example, the plate could be stationary and the conduit 16 could be moved axially toward and away from the plate, this being an equivalent construction.

We claim:

1. In an oxide plugging detector, a conduit for circulating high-temperature liquid metal, said conduit having an open end, a plate having a surface engageable with the open end of said conduit, the surface of said plate having transverse grooves therein providing flow passages for the liquid metal in the tube abutting position of the plate, means responsive to the quantity of liquid metal flowing in said conduit for moving said plate toward and away from the end of said conduit, means for detecting oxide plugging of the plate grooves, and means for cooling the liquid metal upstream of said plate.

2. In an oxide plugging detector, a conduit for circulating high-temperature liquid metal, said conduit having an open end portion having a peripheral surface providing a seat, a plate having a surface for engaging said seat, one of said cooperating surfaces having transverse grooves therein providing flow passages for the liquid metal in the tube abutting position of the plate, means responsive to a reduction in flow in said conduit for separating said surfaces means for detecting oxide plugging of the plate grooves, and means for cooling the liquid metal upstream of said plate.

3. An oxide plugging indicator comprising a conduit for circulating high-temperature liquid metal, said conduit having an open end, an oxide plugging plate having a grooved surface for engaging the open end of said conduit, means for effecting relative separation of said conduit and plate upon plugging of said grooves to re-establish circulation through said conduit and clear said grooves, and means for indicating that plugging at the plate has occurred.

4. A continuous oxide plugging indicator including a conduit open at one end through which high-temperature liquid metal is passed, a plugging plate having a grooved surface which cooperates with the open end of said conduit to provide a valve for controlling the passing of metal through said conduit, means for providing relative movement between said conduit and said plate, means responsive to change in metal flow in said conduit due to plugging of the grooves in said plate for operating said valve to separate said plate and the end of said conduit to re-establish the metal flow in said conduit and clear said grooves, and means for indicating that oxide plugging at the plate has occurred.

5. In an oxide plugging detector, a conduit for circulating high-temperature liquid metal, said conduit having an open end providing a peripheral seat, a plate having a surface for engaging said seat, said plate surface having transverse grooves therein providing flow passages for the liquid metal in the tube abutting position of the plate, plate positioner means for moving said plate axially of said conduit, means upstream of said plate for cooling said liquid metal, means responsive to a reduction in the quantity of metal flowing in said conduit for operating said plate positioner means to move said plate surface away from said seat, and means for detecting oxide plugging of said plate.

6. In an oxide plugging indicator, a conduit for circulating high-temperature liquid metal, said conduit having an open end providing a peripheral seat, a plate having a surface for engaging said seat, said plate surface having transverse grooves therein providing flow passages for the liquid metal in the tube abutting position of the plate, plate positioner means for moving said plate axially of said conduit, means responsive to a reduction in the quantity of metal flowing in said conduit for operating said plate positioner means to move said plate surface away from said seat, and means for indicating a change in the temperature of said plate in response to variations in liquid metal flow.

7. In an oxide plugging indicator, a conduit for circulating high-temperature liquid metal, said conduit having an open end providing an annular seat, a plate having a flat surface provided with radial grooves therein and normally engaging said seat, means for moving said plate axially of said conduit away from and toward said seat, a flowmeter associated with said conduit for measuring the liquid-metal flow in said conduit, a proportional flow controller responsive to the flow signal from said flowmeter, a plate positioner governed by said flow controller for moving said plate away from said seat upon a reduction in flow in said conduit due to plugging of said grooves, and means for indicating a change in the temperature of the liquid metal at said plate in response to variations in liquid metal flow.

8. In an oxide plugging detector, a casing, a conduit extended into said casing having an open end within said casing forming a peripheral seat, a bellows having one end fixed in a fluid-tight manner to the side wall of said casing, a plate forming a closure for said bellows at its opposite end, said plate having a flat face provided with transverse grooves and normally engaging said seat, means for circulating a cooling fluid about said casing in the vicinity of said bellows, a plate positioner, means responsive to a reduction in the quantity of liquid metal flowing in said conduit due to plugging of said grooves for actuating said plate positioner to move said plate away from said seat and restore the normal flow of liquid metal over said plate, and means for detecting oxide plugging at said plate.

9. An oxide plugging detector as claimed in claim 8 in which a backup pressure of inert gas is provided in said casing outside of said bellows.

10. In a continuous oxide plugging indicator, a conduit having an open end providing a peripheral seat, a plugging plate having a plurality of transverse grooves in one of its surfaces, means for positioning said plate with its grooved surface adjacent said seat, means responsive to variation in the quantity of liquid metal flowing in said conduit, a plate positioner governed by said flow responsive means for moving said plate away from said seat in response to a reduction in liquid-metal flow resulting from plugging of said grooves and toward said seat in response to increase in metal flow due to clearing of said grooves, means for circulating a cooling fluid adjacent said plate, and means for continuously indicating a change in the temperature at said plate in response to variations in liquid metal flow.

11. In a high-temperature liquid-metal heat transfer system in which liquid metal is passed from a heat source through a conduit, the combination with said conduit of a valve for controlling the flow through the conduit, said valve having valve members movable relative to each other, one comprising a plugging plate having a grooved surface and the other a conduit having an open end which cooperates with said grooved surface, valve positioning means for positioning said movable valve member, a proportional flow controller for controlling said valve positioning means, a flowmeter in said conduit for governing said flow controller, means for passing a constant stream of cooling air adjacent said conduit, and means for continuously indicating a change in the temperature of said liquid metal in the vicinity of said grooved plate in response to variations in liquid metal flow to afford a measure of oxide contamination of said liquid metal.

12. Apparatus for giving a continuous indication of oxide contamination in a high-temperature liquid metal circulating system comprising a conduit through which the liquid metal is continuously circulated, a valve controlling the flow through the conduit including stationary and movable valve members, one of said members comprising a plugging plate having a grooved surface and the other comprising an open end of said conduit, means for positioning said movable valve member, a proportional flow controller for controlling the operation of said valve positioner, a flowmeter responsive to the flow of liquid metal in said conduit for governing the operation of said flow controller, means providing a constant flow of cooling air adjacent said conduit, and means for giving a continuous indication of a change in the temperature of said liquid metal in the vicinity of said plate in response to variations in liquid metal flow.

13. Apparatus for giving a continuous indication of oxide contamination in a high-temperature liquid metal comprising means for continuously circulating the liquid metal through a chamber including liquid-metal inlet and outlet connections, one wall of said chamber carrying a plugging plate having a radially grooved face, said outlet conduit being extended into said chamber and terminating therein in an open end adjacent said grooved face, means for effecting relative movement between said plate and the open end of said conduit in response to variations in metal flow through said chamber, and means including a thermocouple for continuously indicating a change in the temperature of the liquid metal at said plate in response to variations in liquid metal flow.

References Cited by the Examiner

UNITED STATES PATENTS

| | | | |
|---|---|---|---|
| 1,745,059 | 1/30 | Rush | 137—486 |
| 1,764,181 | 6/30 | Raetz et al. | 137—513.5 X |
| 2,782,369 | 2/57 | Werner et al. | |
| 2,997,874 | 8/61 | Billuris et al. | 73—61 |
| 3,070,994 | 1/63 | Kelley | 73—61 |

LOUIS R. PRINCE, *Primary Examiner.*

JOSEPH P. STRIZAK, RICHARD C. QUEISSER, *Examiners.*